No. 647,381. Patented Apr. 10, 1900.
C. F. W. DOEHRING.
SCAFFOLDING AND ELEVATOR.
(Application filed July 22, 1899.)
(No Model.)
5 Sheets—Sheet 2.
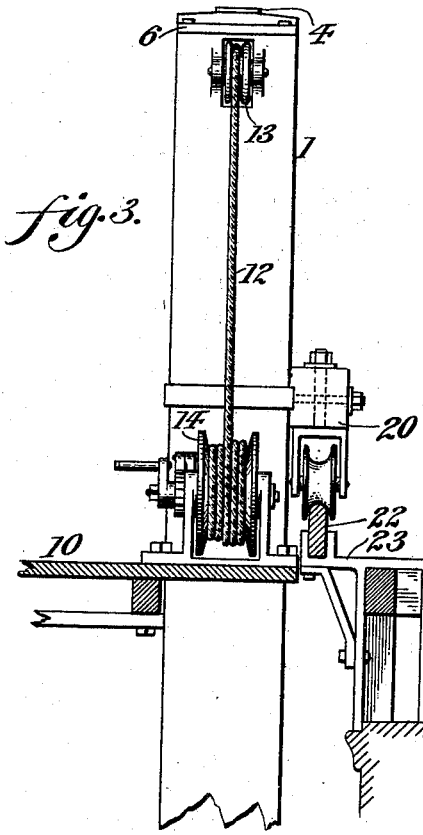
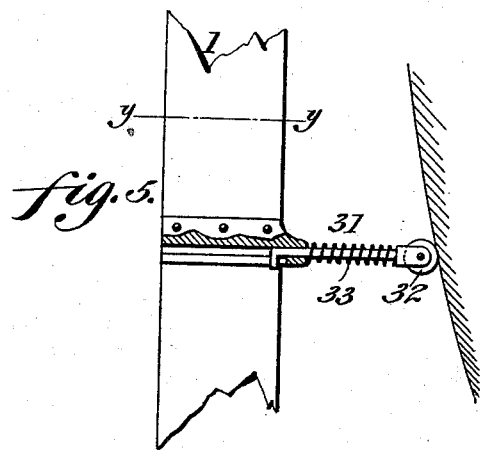
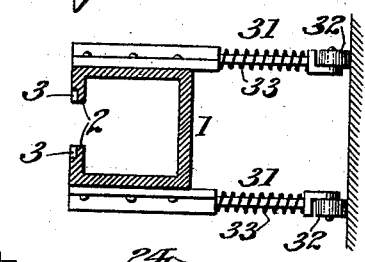
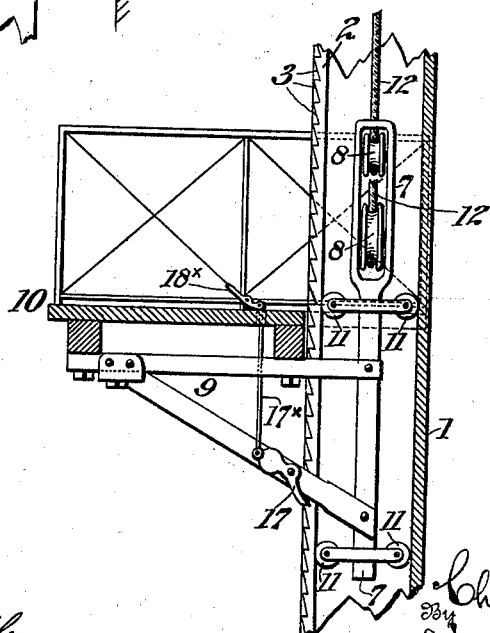
Witnesses
Inventor
Charles F. W. Doehring
Attorneys No. 647,381. Patented Apr. 10, 1900.
C. F. W. DOEHRING.
SCAFFOLDING AND ELEVATOR.
(Application filed July 22, 1899.)
(No Model.) 5 Sheets—Sheet 3.
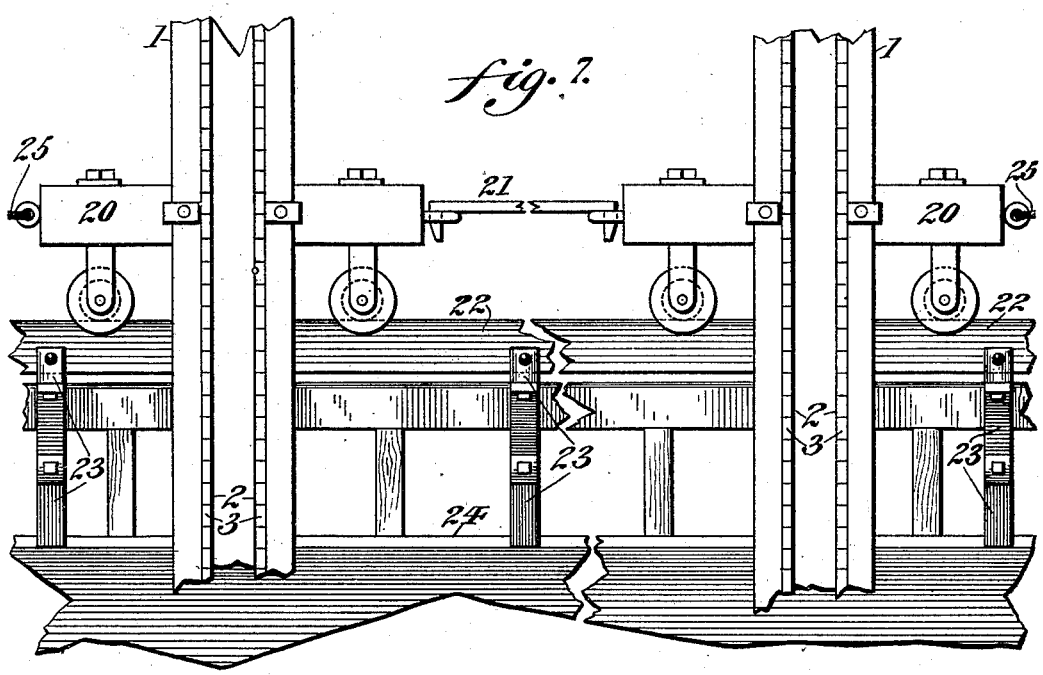
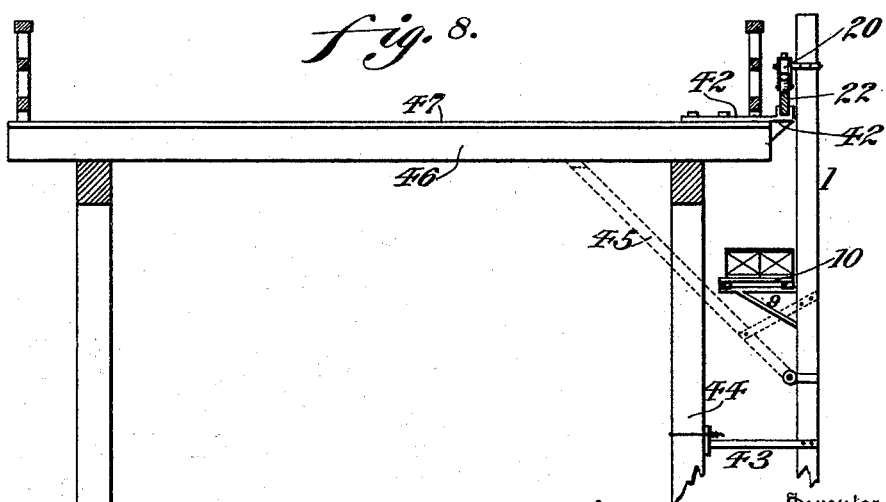

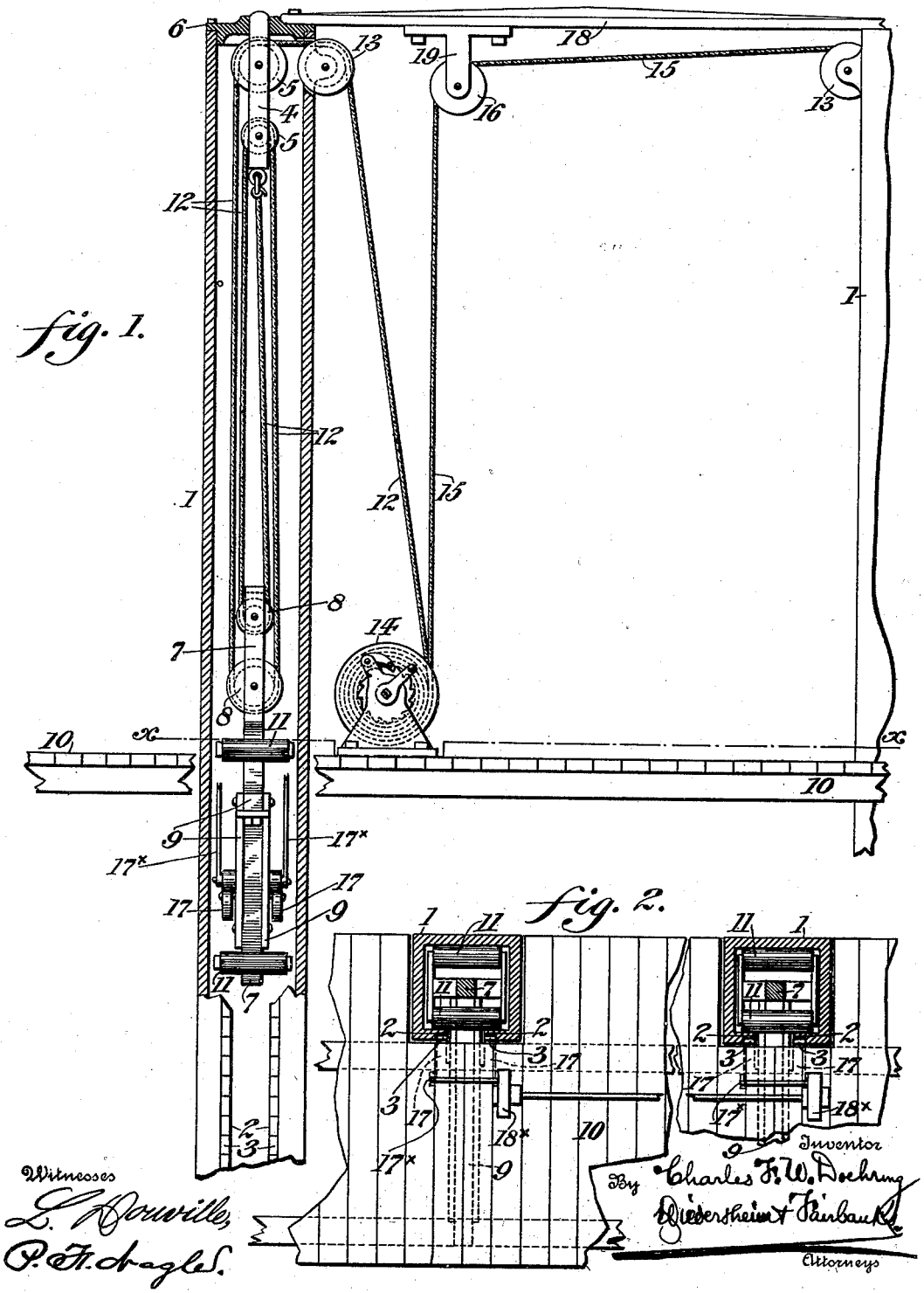

No. 647,381. Patented Apr. 10, 1900.
C. F. W. DOEHRING.
SCAFFOLDING AND ELEVATOR.
(Application filed July 22, 1899.)
(No Model.) 5 Sheets—Sheet 4.
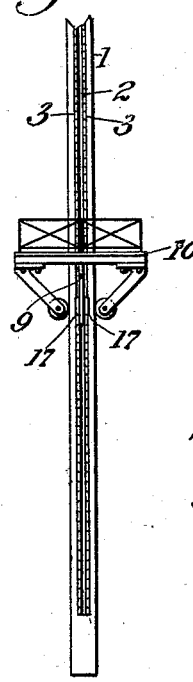
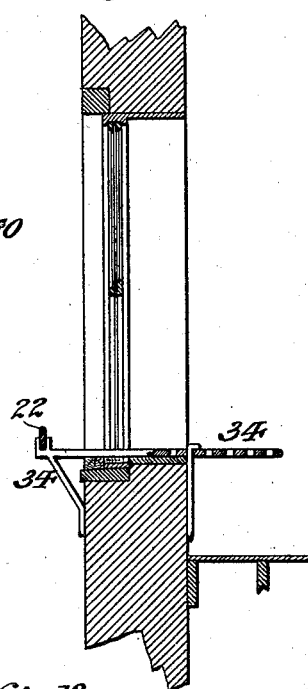
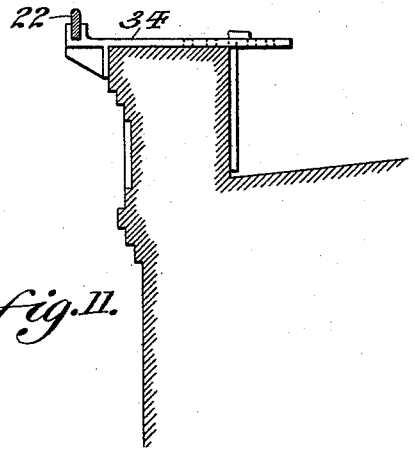
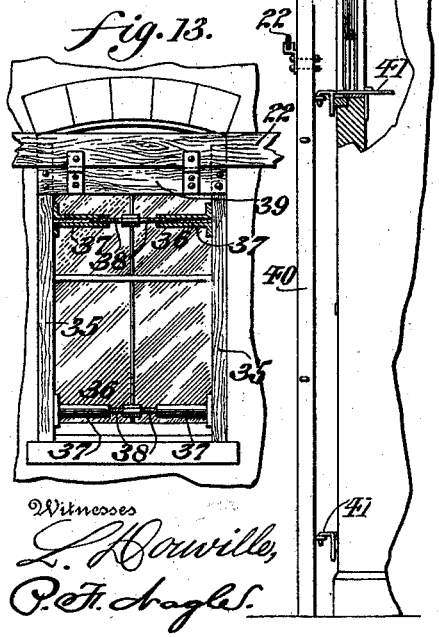
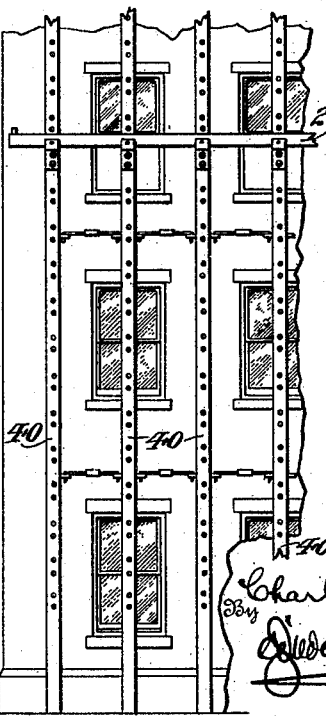

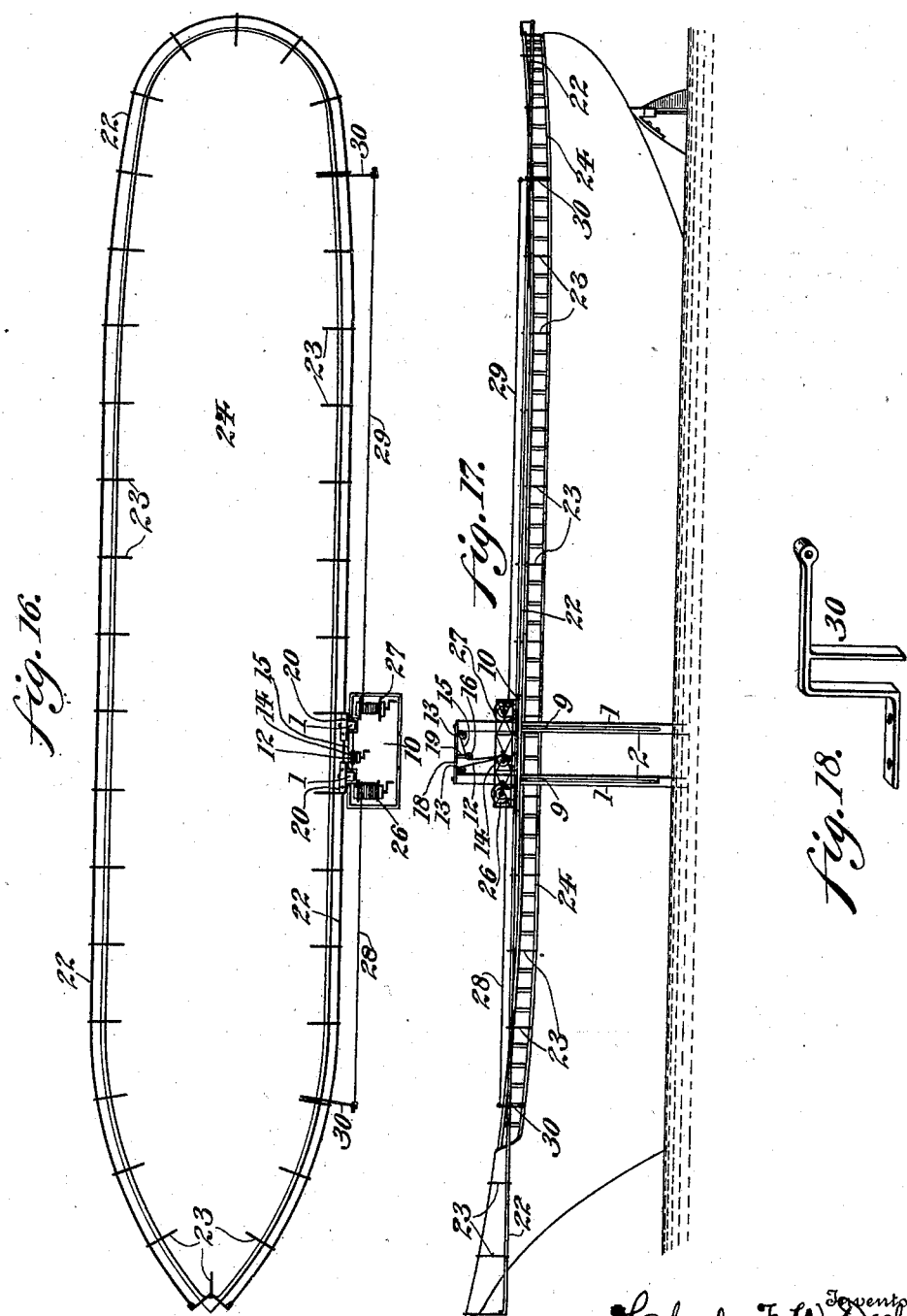

UNITED STATES PATENT OFFICE.

CHARLES F. W. DOEHRING, OF PHILADELPHIA, PENNSYLVANIA.

SCAFFOLDING AND ELEVATOR.

SPECIFICATION forming part of Letters Patent No. 647,381, dated April 10, 1900.

Application filed July 22, 1899. Serial No. 724,732. (No model.)

*To all whom it may concern:*

Be it known that I, CHARLES F. W. DOEHRING, a citizen of the United States, residing in the city and county of Philadelphia, State of Pennsylvania, have invented a new and useful Improvement in Scaffolding and Elevators, which improvement is fully set forth in the following specificaiton and accompanying drawings.

My invention relates to improvements in elevators; and it consists of means whereby the platform or cage forming a part of the same can be readily raised and lowered and also moved to and fro in a horizontal direction.

It also consists of novel means whereby the elevator may be readily applied to buildings, bridges, ships, &c., and easily removed therefrom when desired and without injury to any portion thereof.

To the above end my invention consists of a hollow slotted post or column provided with ratchet-teeth on either side of said slot, said post having located therein a block carrying a bracket which supports a platform and a pawl adapted to engage said ratchet-teeth.

It further consists of novel details of construction, all as will be hereinafter more fully described, and particularly pointed out in the claims.

Figure 1 represents a partial side elevation and partial vertical section of an elevator and its adjuncts embodying my invention. Fig. 2 represents a horizontal section on line $x\ x$, Fig. 1, a portion of the platform having been removed and the hollow posts being nearer together than seen in Fig. 1. Figs. 3, 4, and 5 represent partial side elevations and partial vertical sections of certain detached portions of the device. Fig. 6 represents a horizontal section on line $y\ y$, Fig. 5. Fig. 7 represents a side elevation of certain detached portions of the device. Fig. 8 represents, on a reduced scale, a side elevation of certain portions of the device, illustrating the manner of employing the same in connection with bridges, elevated roads, &c. Fig. 9 represents a front elevation of certain portions of the device wherein but one hollow post is employed instead of two, as seen in Figs. 16 and 17. Fig. 10 represents a partial side elevation and partial vertical section of a jack employed when the device is to be suspended from a window. Fig. 11 represents a side elevation of a jack employed when the device is suspended from the cornice of a roof. Fig. 12 represents a side elevation of a standard and means for securing the same to a wall, the standard resting on the ground and having a rail from which may be suspended my invention. Fig. 13 represents a front elevation of a modified form of construction for sustaining the rail from which the device is suspended. Fig. 14 represents a front elevation of Fig. 12. Fig. 15 represents a side elevation of the jack seen in Fig. 11 and illustrates the manner of applying the same to a smoke-stack. Fig. 16 represents a plan view of my invention, showing its application to a ship. Fig. 17 represents a side elevation of Fig. 16. Fig. 18 represents a perspective view of a bracket employed in connection with my invention.

Similar numerals of reference indicate corresponding parts in the figures.

Referring to the drawings, 1 designates a hollow post or column, the same having a vertical slot 2 therein and a rack 3 on both sides of said slot.

4 designates a stationary block provided with sheaves 5 and located within the hollow post 1, said block being suspended from the cap 6 of said post.

7 designates a movable block located within said post and provided with sheaves 8 and having secured thereto a bracket 9, which supports a platform 10, adapted to raise and lower in unison with said bracket. The brackets 9, which support the platform 10, pass through the slot 2 in the posts 1 and project sufficiently beyond the latter to securely sustain said platform, as best seen in Fig. 4.

The block 7 is provided with rollers 11 to properly guide the same within the post 1 during the movement of said block.

12 designates a rope or other connection, one end of which is secured to the stationary block 4, said rope passing around the sheaves 5 and 8, then over a pulley 13, journaled in the post 1, from which point said rope leads to a drum 14, to which its other end is secured.

15 designates a rope which after passing over a pulley 13 is brought over a pulley 16 and from this point to the drum 14, as best seen in Fig. 1.

It will be understood that when the weight to be raised and lowered by this elevator is unusually heavy the posts 1 are employed in pairs, as seen in Figs. 1, 2, 7, 16, and 17; but when the weight is not excessive only one post may be employed, as seen in Fig. 9.

The bracket 9 is provided with pawls 17, which normally engage the teeth of the racks 3, so as to prevent the platform 10 from dropping in the event of the breaking of the ropes 12 or 15, and thus remove all danger of injury to persons or freight carried by said platform.

When the posts 1 are used in pairs, the same may be secured together by a bar 18, as seen in Figs. 1 and 17, it being noted that the pulley 16 is journaled in a hanger 19, which depends from said bar 18.

The posts 1 are each secured to a carriage 20, so as to permit the former to be moved either to the right or left, as may be required. The carriages 20 are coupled together in the present instance by a rod 21, so as to prevent the posts 1 from moving independently either toward or from each other, thereby causing said posts at all times to remain the same distance apart and to move in unison either to the right or to the left. The carriages 20 are guided on a rail 22, supported by brackets 23, which may be secured in any suitable manner to the deck 24 of a ship, as seen in Figs. 3, 7, 16, and 17. The carriages 20 may, if desired, be provided with ropes 25, which may be operated by an attendant on deck in order to cause the post or posts 1 and their adjuncts to move either to the right or left, as seen in Fig. 7.

If desired, the platform 10 may be provided with drums 26 and 27, around which are wound the ropes 28 and 29, respectively. One end of the rope 28 is fastened to a bracket 30, and its opposite end is fastened to the drum 26. In like manner one end of the rope 29 is fastened to a bracket 30, and its opposite end is fastened to the drum 27, it being apparent that when one of said drums is wound and the other is unwound the platform 10 must evidently move either to the right or to the left, as may be desired.

The pawls 17 are each connected by a rod 17$^\times$ to a treadle 18$^\times$, so that when the latter is operated (in the present instance by the foot of the attendant) the same will cause said pawls 17 to become disengaged from the teeth of the racks 3, and thereby permit the platform 10 to be raised or lowered, as desired.

The posts 1 are provided with spring-actuated guides 31, each of which carries a roller 32, adapted to bear against the adjacent wall, as that of a building, or the sides of a ship, to which the invention is applied, and when the surface with which the rollers 32 contact is curved, as seen in Fig. 5, it will be apparent that when the platform 10 is being lowered the springs 33 will cause the rollers to advance, and thus keep them always in contact with said curved surface, and thereby prevent the posts 1 from swinging inwardly. When the platform 10 is being raised, it will be apparent that the springs 33 will be compressed, and thereby permit said rollers 32 to move inwardly, so as to conform to the curvature of the contiguous surface with which they are in contact.

The operation is as follows: When it is desired to suspend the elevator from the windows of a building, as seen in Fig. 10, jacks 34 are employed, said jacks having secured thereto the rail 22, on which is guided the carriages 20 which sustain the posts 1, so that said posts 1, and consequently the platform 10, may be caused to travel in a horizontal direction and by any suitable means. When the posts 1 are to be supported from the cornice of a building, the jacks 34 are placed in position, as seen in Fig. 11, and when from the top of a smoke-stack or chimney the jacks are located as seen in Fig. 15. When it is desired to dispense with the jacks 34, the device seen in Fig. 13 may be employed, said device consisting of standards 35, held firmly against the jambs of a window by the clamps 36, which consist of the sleeves 37, provided with internal screw-threads, one of said sleeves in each pair having a right-hand thread and the other sleeve a left-hand thread, with which engage the right and left hand screw-threaded portions of the rods 38, so that when said rods are rotated in one direction the same will cause the standards 35 to bear firmly against the jambs and retain the same in position, and when said rods are rotated in a reverse direction the same will no longer exert a pressure against the standards 35 and will permit the latter to be removed from the window. The standards 35 have secured thereto a cross-piece 39, which supports the rail 22, on which the carriages 20 travel. When it is desired to support the rail 22 from the ground instead of suspending the same, as hereinbefore described, the standards 40 are employed, as seen in Figs. 12 and 14, it being noted that said standards are retained in position by jacks 41, as seen in Fig. 12. When the nature of the work to be accomplished requires the service of but one or two persons, the platform 10 (seen in Fig. 9) may be employed, in which case only one post 1 is required, it being understood that the means employed for raising and lowering said platform may be a block and tackle similar to that seen in Fig. 1. When it is desired to employ the elevator in connection with elevated roads, bridges, &c., the brackets 42 (seen in Fig. 8) may be employed for sustaining the rail 22 and its adjuncts, and the post or posts 1 may be prevented from swaying by the employment of braces 43, when the same can be secured to the posts 44, and when such is not the case then the braces 45 are employed, which abut against the beams 46 or in some cases may abut against the under side of the flooring 47. When it is desired to raise the platform 10, the drum 14 is rotated, so as to cause the ropes 12 and 15 to wind thereon, or, if it is desired to lower said platform, the drum 14 is rotated, so as to unwind said ropes therefrom, as is evident.

Having thus described my invention, what I claim as new, and desire to secure by Letters Patent, is—

1. In an apparatus of the character named, a hollow post or column suspended from its upper portion, a block located therein, means for raising and lowering said block, a bracket carried by the latter and supporting a platform, guiding devices located interiorly of said post for guiding said block, a pawl carried by said bracket, ratchet-teeth upon said post adapted to be engaged by said pawl, and spring-pressed rods carried by the lower portion of said post, extending laterally therefrom and adapted to contact with the adjacent wall.

2. The combination of a hollow post or column suspended from its upper portion and having a longitudinally-extending slot therein, ratchet-teeth on said post, a bracket carrying a platform, a pawl carried by said bracket and adapted to be operated from said platform, said pawl engaging said teeth, means for raising and lowering said platform and bracket, laterally-extending spring-actuated guides carried by the lower portion of said post and having rollers adapted to engage the contiguous wall.

3. The combination of a hollow post or column, a block located therein, a platform supported on said block, means for raising and lowering said block and platform, guiding devices for said block located in the interior of said post, a carriage attached to the latter, and a rail or track upon which said carriage is adapted to travel.

4. The combination of a plurality of hollow posts or columns having longitudinally-extending slots therein, a block located within each of said posts and having a platform suitably supported thereupon, means for raising and lowering said block and platform, a laterally-extending track or rail, carriages secured to each of said posts and adapted to travel on said track, a connection common to said carriages and means for moving said carriages and posts in either direction in unison.

5. The combination of a rail or track, a carriage mounted thereon, a movable post or column supported by said carriage, means for holding said post or column in position relative to a wall, a block movable upon said post or column, a platform and bracket upon said block, and means for actuating said block.

CHARLES F. W. DOEHRING.

Witnesses:
JOHN A. WIEDERSHEIM,
E. HAYWARD FAIRBANKS.